(12) United States Patent
Lee et al.

(10) Patent No.: US 7,784,737 B2
(45) Date of Patent: Aug. 31, 2010

(54) DRAG REDUCTION FAIRING

(75) Inventors: Robert Michael Lee, Kirkland, WA (US); Brian G. Evans, Sumner, WA (US)

(73) Assignee: The Boeing Company, Chicago, IL (US)

( * ) Notice: Subject to any disclaimer, the term of this patent is extended or adjusted under 35 U.S.C. 154(b) by 966 days.

(21) Appl. No.: 11/230,177

(22) Filed: Sep. 19, 2005

(65) Prior Publication Data

US 2007/0063102 A1 Mar. 22, 2007

(51) Int. Cl.
*B64C 1/38* (2006.01)
(52) U.S. Cl. .................... 244/129.1; 244/130; 362/459; 362/470; 362/473; 362/477; 362/478
(58) Field of Classification Search .................. 244/130, 244/129.1; 362/459, 470, 473, 477, 478
See application file for complete search history.

(56) References Cited

FOREIGN PATENT DOCUMENTS

| GB | 0320730 | 10/1929 |
|---|---|---|
| GB | 0449290 | 6/1936 |
| GB | 0609932 | 10/1948 |
| GB | 2364769 A | 2/2002 |
| GB | 2367118 A | 3/2002 |
| WO | WO8601175 A1 | 2/1986 |

OTHER PUBLICATIONS

GB Search and Examination Report for Application No. GB0618324.8, dated Jan. 15, 2007, 6 pages.

*Primary Examiner*—J. Woodrow Eldred

(57) ABSTRACT

A vehicle including a body having an exterior surface and a protrusion extending outward from the surface. The vehicle further includes a fairing mounted on the surface directly adjacent and behind the protrusion. The fairing has a forward end, an aft end opposite the forward end, and opposing sides extending between the forward end and the aft end. The opposing sides become progressively closer together from the forward end to the aft end so that the bracket has a tapered shape.

8 Claims, 5 Drawing Sheets

DRAG REDUCTION FAIRING

BACKGROUND OF THE INVENTION

The present invention relates to vehicles having a drag reduction fairing and, more particularly, to aircraft having a drag reduction fairing.

Protrusions extending from surfaces of a vehicle cause drag when the vehicle moves. How much drag is caused by a protrusion is related to a shape and size of the protrusion, a shape of the vehicle, and a position and orientation of the protrusion on the vehicle. Higher amounts of drag are caused by protrusions that do not have a streamlined aft end (e.g., the aft end includes a generally vertical wall extending perpendicular to a direction of vehicle motion) because turbulent separation of airflow develops behind the aft end of the protrusion. Under some circumstances, a high-frequency oscillating vortex pattern, known as a von Karman vortex street, may develop behind the protrusion. von Karman vortex streets increase drag and may increase interior vehicle noise.

Higher amounts of drag results in lower fuel efficiency. Lower fuel efficiency necessitates an increase in block fuel, the added weight of which also decreases fuel efficiency, or a payload reduction to achieve comparable flight distances. One solution for reducing drag is to replace non-streamlined protrusions with streamlined protrusions. However, replacing entire protrusions can be a costly endeavor.

A type of protrusion commonly used on aircraft is an anti-collision light. Because federal aviation regulations require that anti-collision lights be visible in a 360° pattern around aircraft, any streamlining feature added adjacent to or as part of the anti-collision light must allow light to pass through it. A cost effective device for improving drag characteristics of new and in-service vehicles having a protrusion is needed.

BRIEF SUMMARY OF THE INVENTION

The present invention relates to a vehicle comprising a body having an exterior surface and a protrusion extending outward from the surface. The vehicle further comprises a fairing mounted on the surface directly adjacent and behind the protrusion. The fairing has a forward end, an aft end opposite the forward end, and opposing sides extending between the forward end and the aft end. The opposing sides become progressively closer together from the forward end to the aft end so that the bracket has a tapered shape.

In another aspect, the present invention includes a fairing configured for mounting on a vehicle having a surface and a protrusion extending outward from the surface. The fairing comprises a mount having a forward end adapted for mounting on the vehicle adjacent to and behind the protrusion. The fairing further comprises a cover mounted on the mount. The cover has a forward end, an aft end opposite the forward end of the cover, and opposing sides extending between the forward end of the cover and the aft end of the cover. The opposing sides become progressively closer together from the forward end to the aft end so that the bracket has a tapered shape.

In yet another aspect, the present invention includes a method of assembling a fairing having a mount, a cover, and a trim onto a vehicle having a surface and a protrusion extending from the surface. The method comprises mounting the mount on the vehicle surface adjacent and behind the protrusion. The method further comprises attaching the cover to the mount and attaching the trim to the cover.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
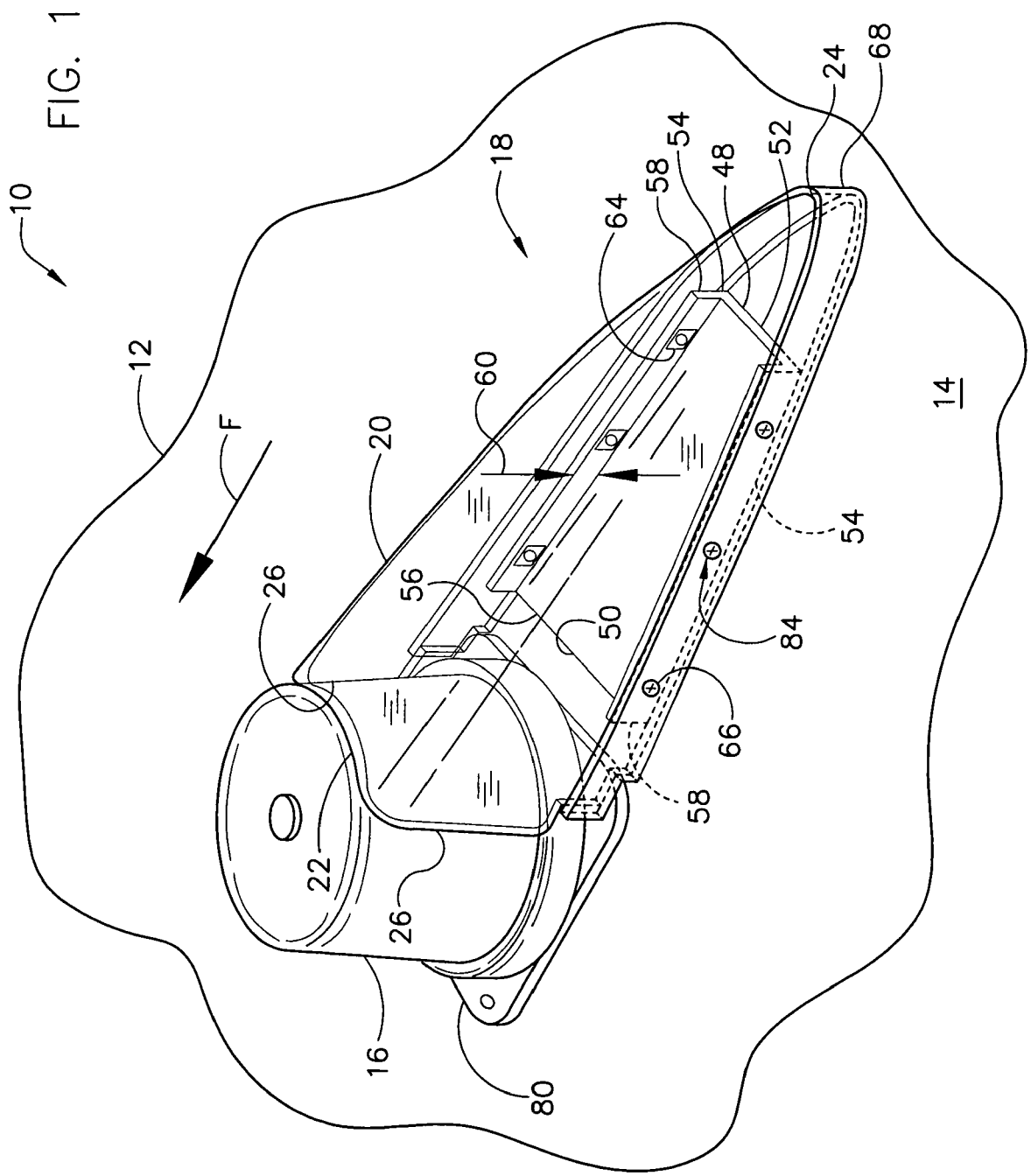
FIG. 1 is a perspective of a vehicle including a fairing according to a first embodiment of the present invention.

Referring to the drawings, and more particularly to FIG. 1, a vehicle according to a first embodiment of the present invention is designated in its entirety by reference number 10. Although the vehicle 10 may be other types without departing from the scope of the present invention, in one embodiment the vehicle is an aircraft having a forward travel direction "F". The vehicle 10 comprises a body 12 having an exterior surface 14. Although the vehicle body 12 may be made of other materials without departing from the scope of the present invention, in one embodiment the body is made primarily of sheet metal. Although the surface 14 is shown as a top surface of the vehicle 10, the surface may be other surfaces of the vehicle without departing from the scope of the present invention. For example, in one embodiment the surface 14 is a bottom surface of the vehicle 10. The vehicle 10 further comprises a protrusion 16 extending outward from the surface 14. Although the protrusion 16 may be other items without departing from the scope of the present invention, in one embodiment the protrusion is a generally cylindrical anti-collision light. The vehicle 10 also comprises a fairing, generally designated by reference number 18, mounted on the surface 14 of the vehicle directly adjacent and behind the protrusion 16.

The fairing 18 includes a cover 20 having a forward end 22, an aft end 24 opposite the forward end, and opposing sides 26 extending between the forward end and the aft end. The sides 26 of the cover 20 may be generally straight between the forward and aft ends 22, 24 or they may be arcuate. Although the cover 20 may be made of other materials without departing from the scope of the present invention, in one embodiment the cover is made of a substantially transparent material. For example, in one embodiment the cover is made of a visually transparent glass or plastic, such as a polycarbonate or an acrylic. Benefits of having a substantially transparent cover 20 include the ability for signals emitted from the protrusion 16 to be transmitted through the cover. For example, the light produced by an anti-collision light will be visible in a 360° pattern around the vehicle 10 when a fairing 18 having a visibly transparent cover 20 is installed on the vehicle adjacent the light.

Figure 2:
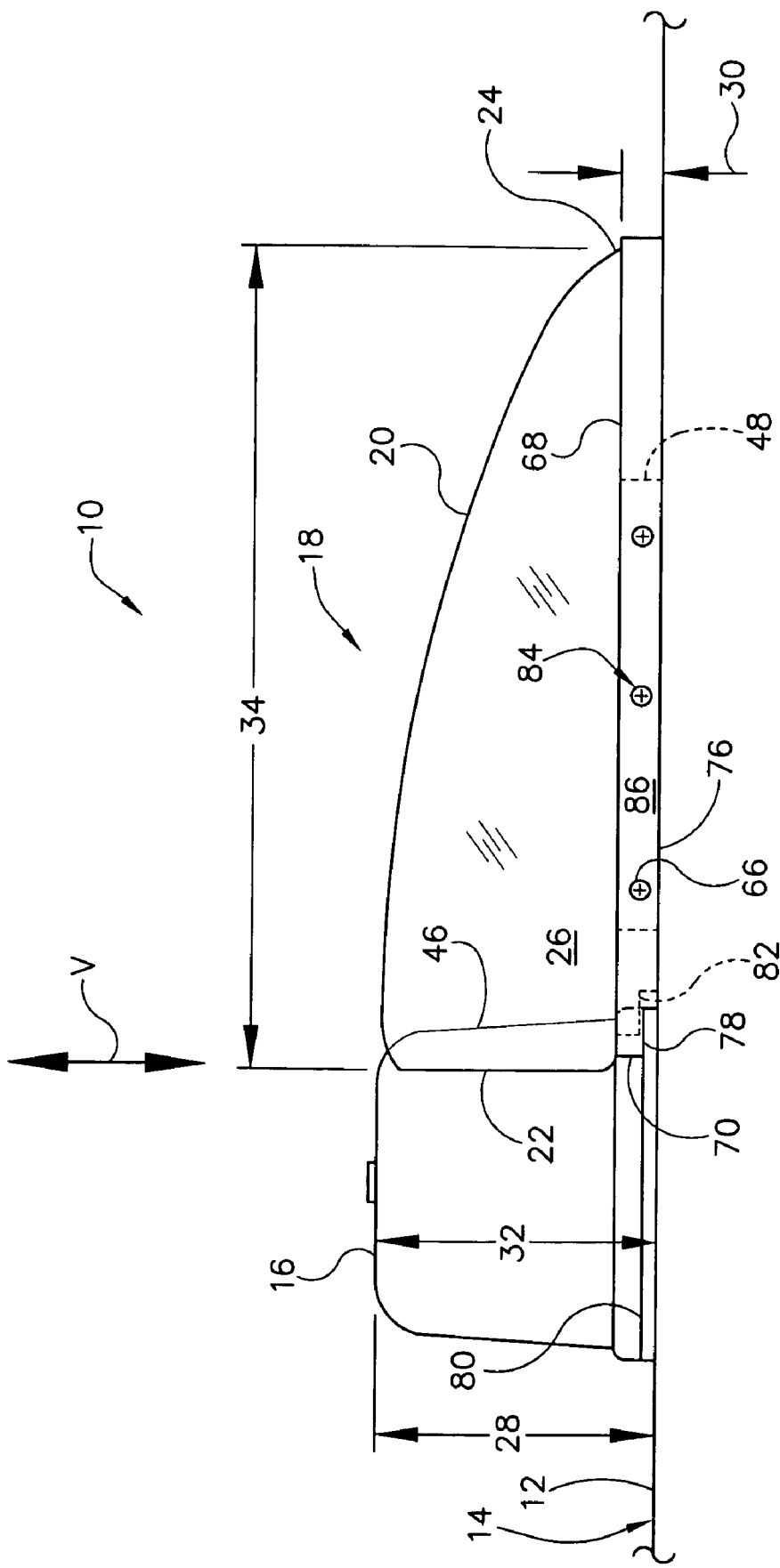
FIG. 2 is a side elevation of the vehicle including the fairing.
Figure 3:
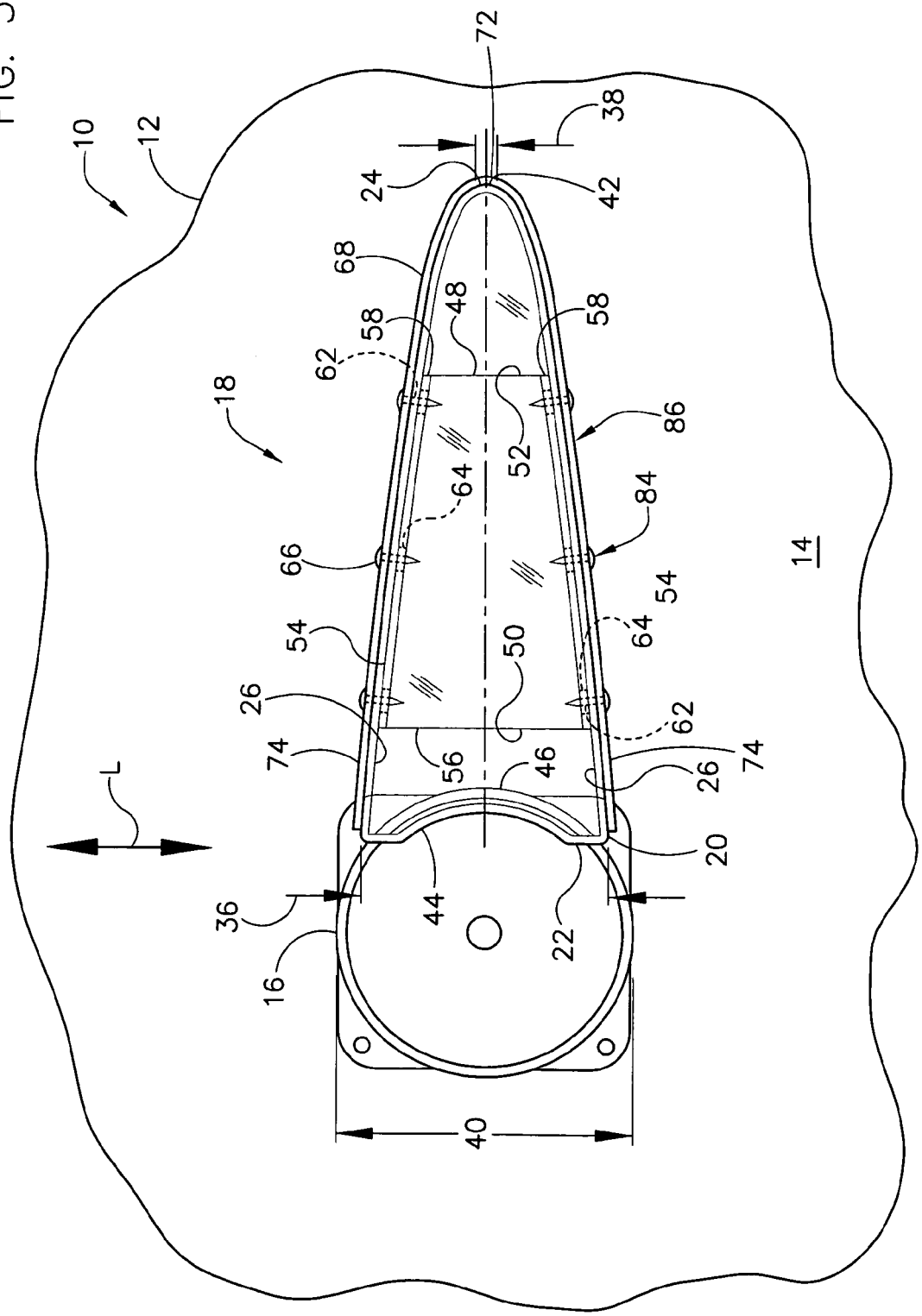
FIG. 3 is a top plan of the vehicle including the fairing.

As shown in FIG. 2, the cover 20 has a maximum height 28 adjacent the forward end 22 and a minimum height 30 adjacent the aft end 24 of the cover. Although the cover 20 may have other maximum heights 28 without departing from the scope of the present invention, in one embodiment the cover has a maximum height between about 2 inches and about 4 inches. Although the cover 20 may have other minimum heights 30 without departing from the scope of the present invention, in one embodiment the cover has a minimum height of between 0 inches and about 1 inch. In one embodiment, the maximum height 28 of the cover 20 corresponds to a height 32 of protrusion 16. Although the cover height may decrease from the maximum height 28 to the minimum height 30 in other ways, in one embodiment the height decreases logarithmically. Although the cover 20 may have other lengths 34, in one embodiment the cover has a length of between about 8 inches and about 12 inches. As shown in FIG. 3, the cover 20 has a maximum width 36 adjacent the forward end 22 and a minimum width 38 adjacent the aft end 24 of the cover. Although the cover 20 may have other maximum widths 36 without departing from the scope of the present invention, in one embodiment the cover has a maximum width of between about 3 inches and about 5 inches. In one embodiment, the maximum width 36 of the cover 20 corresponds to a maximum width 40 of the protrusion 16. Although the cover 20 may have other minimum widths 38 without departing from the scope of the present invention, in one embodiment the cover has a minimum width of between about 0 inches and about 2 inches. In one embodiment, the opposing sides 26 of the cover 20 become progressively closer together from the forward end 22 to the aft end 24 so the cover has a tapered shape. In one embodiment, the sides 26 of the cover 20 taper arcuately towards each other and meet at a vertex 42.

The forward end 22 of the cover 20 may have a shape corresponding to a shape of the protrusion 16 so the cover can be mounted flush against the protrusion when the fairing is mounted on the vehicle 10. For example, the forward end 22 of the cover may include a concave portion 44 for accommodating an aft end 46 of the protrusion 16. The cover 20 may overlap the protrusion 16 in multiple directions. For example, the cover 20 may overlap the protrusion 16 in a generally vertical direction, indicated by arrow "V" in FIG. 2, and in a generally lateral direction, indicated by arrow "L" in FIG. 3. The cover 20 may overlap the protrusion 16 in many other directions besides these two orthogonal directions V, L.

As shown in FIGS. 1 and 3, the fairing 18 further includes a mount 48. The mount 48 is mounted on the exterior surface 14 of the vehicle body 12 adjacent to and behind the protrusion 16 and the cover 20 is attached on the mount 48. Although the mount 48 may be made of other materials without departing from the scope of the present invention, in one embodiment the mount is made of aluminum. It is contemplated that the cover and the mount may be integrally formed (not shown). The mount 48 has a forward end 50, an aft end 52 opposite the forward end of the mount, and opposing sides 54. The sides 54 of the mount 48 may be generally straight between the forward and aft ends 50, 52 of the mount or arcuate to match an arcuate shape of the sides 26 of the cover 20. The mount 48 and the cover 20 have matching shapes so the sides 54 of the mount and the sides 26 of cover correspond when the fairing 18 is assembled. The mount 48 includes a base 56 that is secured to the surface 14 of the vehicle body 12 when mounting the fairing 18 on the vehicle 10. Although the mount 48 may be mounted on the vehicle 10 in other ways, in one embodiment the mount is mounted on the vehicle by adhesive bonding or riveting.

The mount 48 may also have a pair of flanges 58 extending from the base 56 adjacent the sides 54. The base 56 and flanges 58 of the mount 48 may be integrally formed. Although the flanges 58 may have other heights 60 (shown in FIG. 1) without departing from the scope of the present invention, in one embodiment each flange has a height of between about 0.75 inches and about 1 inch. The sides 26 of the cover 20 are attached to the flanges 58 of the mount 48 when the fairing 18 is assembled. The cover 20 may be attached to the mount 48 in various ways without departing from the scope of the present invention. In one embodiment, the sides 26 of the cover 20 have fastener holes 62 (FIG. 3) adjacent the mount 48 and the mount 48 has nut plates 64 embedded in the flanges 58 corresponding to the fastener holes of the cover. In this embodiment, screws 66 are inserted into the fastener holes 62 of the cover 20 and threaded into the nut plates 64 to attach the cover to the mount 48.

The fairing 18 further includes trim 68 attached to the sides 26 of the cover 20 and/or the sides 54 of the mount 48. The trim 68 can improve the aerodynamic, aesthetic, and/or structural qualities of the fairing 18. As shown in FIG. 3, the trim 68 has a forward end 70, an aft end 72 opposite the forward end of the trim, and opposing sides 74 extending between the forward and aft ends of the trim. The opposing sides 74 of the trim 68 may taper towards each other from the forward end 70 to the aft end 72 to correspond to the tapered shape of the cover 20. Although the trim 68 may be made of other materials without departing from the scope of the present invention, in one embodiment the trim is made of aluminum. As shown in FIG. 2, the trim 68 has a base portion 76 for positioning directly adjacent the vehicle 10 when mounting the fairing 18 on the vehicle. In one embodiment, the base portion 76 includes a step 78 adjacent the forward end 70 of the trim 68 corresponding to a step portion 80 of the protrusion 16 or of the vehicle 10 adjacent the protrusion for enabling a flush fit between the fairing 18 and the vehicle when the fairing is mounted on the vehicle. The cover 20 may also include a step 82 corresponding with the step 78 of the trim 68 and the step portion 80 of the protrusion 16 or of the vehicle 10 for enabling a flush fit between the fairing 18 and the vehicle when the fairing is mounted on the vehicle. Although the trim 68 may be attached to the cover 20 and the mount 48 in other ways without departing from the scope of the present invention, in one embodiment the trim is attached to the cover and the mount by the same screws 66 used to connect the cover and the mount. In one embodiment, heads 84 of the screws 66 are flush with an exterior surface 86 of the trim or the screw heads are covered to improve the aesthetic and aerodynamic characteristics of the fairing 18. In this embodiment, as will be appreciated by those skilled in the art, the trim 68 provides structural support for the fairing 18 and distributes the screw loading applied to the cover 20.

Figure 4:
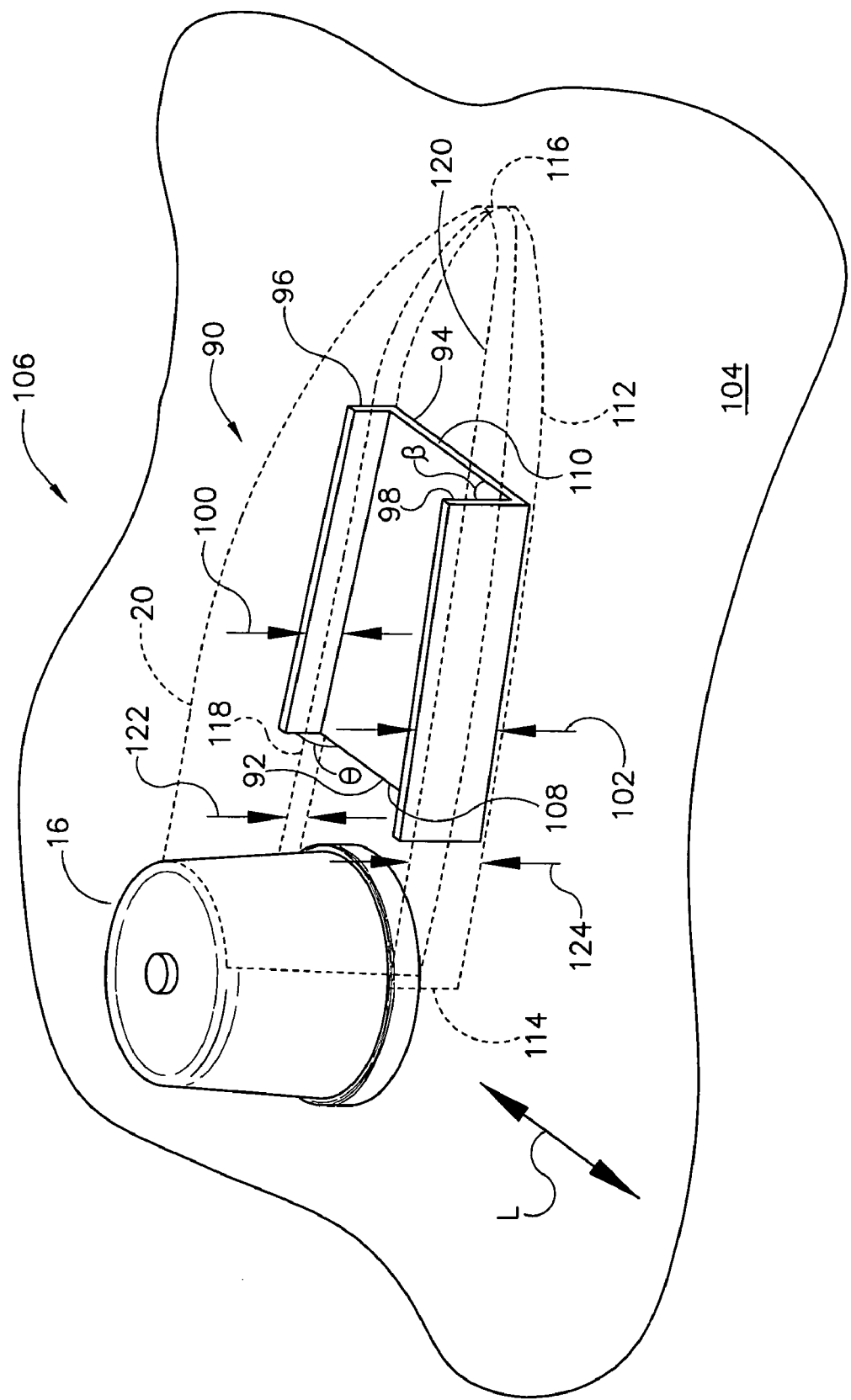
FIG. 4 is a perspective of a vehicle including a fairing according to a second embodiment of the present invention showing a cover and a trim of the fairing as hidden.

FIG. 4 shows an embodiment of a fairing 90 comprising a mount 92 including a base 94 and opposing flanges 96, 98 having different heights 100, 102 extending from the base. The base 94 and flanges 96, 98 of the mount 92 may be integrally formed. The difference between the flange heights 100, 102 corresponds to a change in elevation of a surface 104 of the vehicle 106 in the lateral direction "L". In this embodiment, an angle θ between the shorter flange 96 and the base 94 may be greater than an angle β between the taller flange 98 and the base so the flanges are generally parallel to each other for a proper fit with the cover 20. Although the shorter flange 96 and the base 94 may be separated by other angles θ without departing from the scope of the present invention, in one embodiment the shorter flange and the base are separated by an angle of between 90° and about 100°. Although the taller flange 98 and the base 94 may be separated by other angles β without departing from the scope of the present invention, in one embodiment the taller flange and the base are separated by an angle of between about 81° and 90°.

In one embodiment, the height 100, 102 of each flange 96, 98 is uniform from a forward end 108 to an aft end 110 of the mount. It is contemplated that the height 100, 102 of each flange 96, 98 may vary (not shown) from the forward end 108 to the aft end 110, corresponding to a vehicle surface that changes elevations (not shown) between the forward and aft ends (i.e., in the longitudinal direction). The flange heights 100, 102 may depend, among other things, on the nature of the surface 104 on which the fairing 90 is mounted. The same cover 20 may be attached to mounts 48, 92 having flange heights 60, 100, 102 that are the same as each other (as shown in FIG. 1), are different from each other (as shown in FIG. 4), or vary from the forward end 108 to the aft end 110 (not shown). A mount 92 having flanges 96, 98 of different and/or varying heights 100, 102 allows the cover 20 to be level (i.e., horizontal) when the surface 104 on which the mount is mounted is canted in one or more directions (e.g., in the lateral and/or longitudinal direction). The ability to use the same cover 20 notwithstanding the nature of mount flange heights 60, 100, 102 reduces material and labor costs associated with producing and using various covers for various mounting environments. The fairing 90 also includes trim 112 having a forward end 114, and aft end 116 opposite the forward end, and opposing sides 118, 120. The sides 118, 120 may have heights 122, 124 that are different from each other and/or vary from the forward end 114 to the aft end 116 of the trim to correspond to the different and/or varying flange heights 100, 102 of the mount 92. For example, as shown in FIG. 4, the trim 112 may have a shorter side 118 corresponding to the shorter flange 96 of the mount 92 and a taller side 120 corresponding to the taller flange 98 of the mount.

Figure 5:
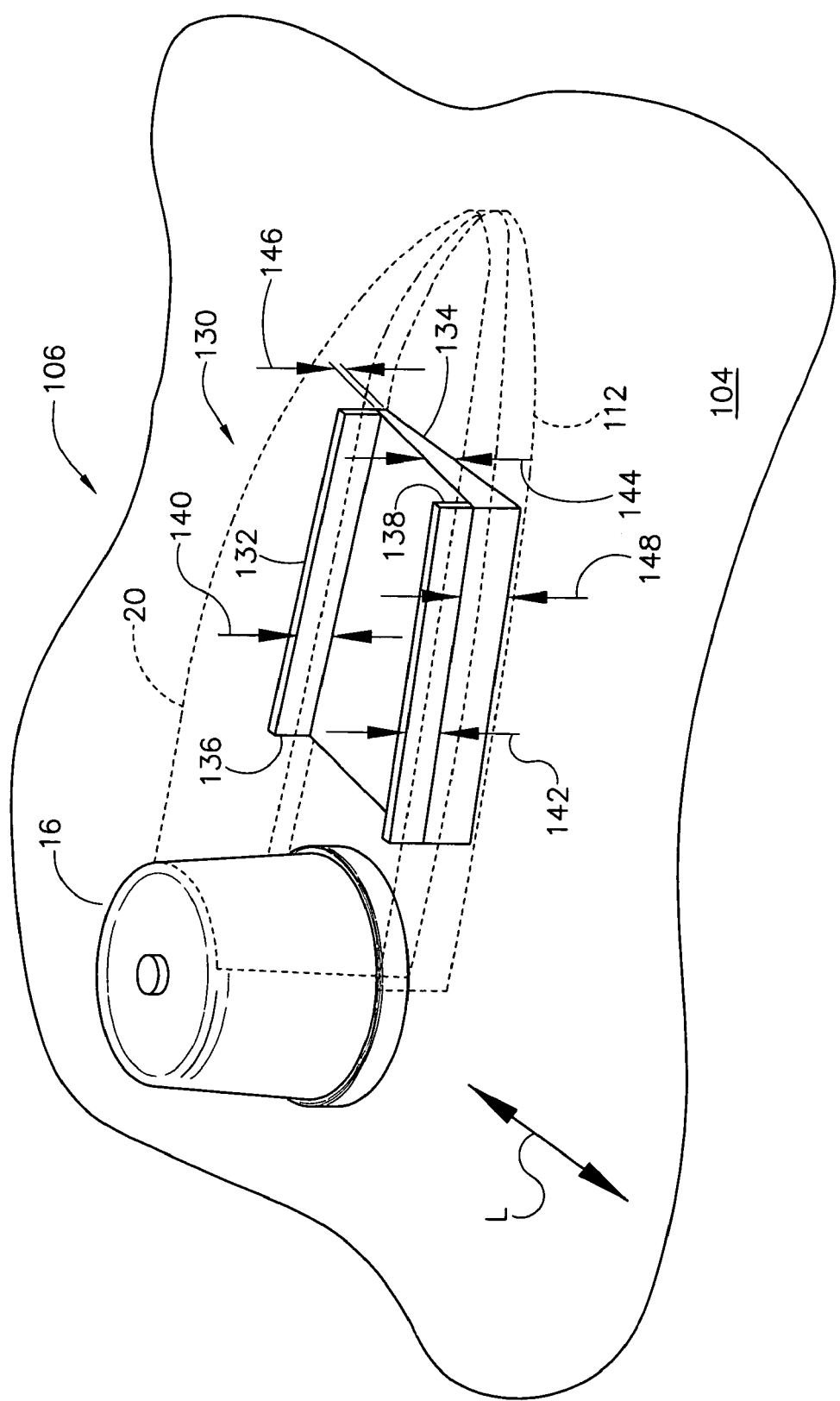
FIG. 5 is a perspective of a vehicle including a fairing according to a third embodiment of the present invention showing a cover and a trim of the fairing as hidden.

Fairings according to the present invention may be configured in other ways to compensate for changes in vehicle surface elevation of the vehicle on which the fairing is mounted. For example, FIG. 5 shows an embodiment of a fairing 130 according to the present invention mounted on a canted surface 104 of the vehicle 106. The fairing 130 includes a mount 132 having a base 134 and flanges 136, 138 extending from the base. The base 134 and flanges 136, 138 of the mount 132 may be integrally formed. In this embodiment, the flanges 136, 138 have heights 140, 142, respectively, that are approximately equal. The base 134 of the mount 132 has a thickness 144 that tapers from a minimum thickness 146 adjacent a first flange 136 of the two mount flanges to a maximum thickness 148 adjacent a second flange 138 of the two mount flanges. Although the mount base 134 may have other minimum thicknesses 146 without departing from the scope of the present invention, in one embodiment the base has a minimum thickness of between about 0.1 inches and 0.3 about inches. Although the mount base 134 may have other maximum thicknesses 148 without departing from the scope of the present invention, in one embodiment the base has a maximum thickness of between about 0.4 inches and about 0.6 inches. The variation in base thickness corresponds to a change in elevation of the surface 104 of the vehicle 106 in the lateral direction "L". The mount 132 may also change thicknesses in other ways to compensate for changes in vehicle 106 surface 104 elevations. For example, in one embodiment (not shown), the mount 132 thickness 144 changes between forward and aft ends of the mount corresponding to a vehicle surface that changes elevations (not shown) between the forward and aft ends (i.e., in the longitudinal direction). It is also contemplated that the thickness 144 of the mount base 134 may vary to correspond to other vehicle 106 surface 104 characteristics, such as protrusions extending above the surface.

Fairings 18, 90, 130 according to the present invention can be mounted on the vehicle 10, 106 during vehicle manufacture or retrofitted onto the vehicle after manufacture. For example, the fairing 18, 90. 130 can be assembled onto a vehicle 10, 106 that has been in service for many years to improve the aerodynamic qualities of the vehicle for a relatively low cost. Whether the fairing 18, 90, 130 is mounted on the vehicle 10, 106 during or after vehicle manufacture, the fairing may be mounted on the vehicle in various ways. For example, components of the fairing 18, 90, 130 may be assembled together and then mounted on the vehicle 10, 106, mounted on the vehicle piece-by-piece, or may be partially assembled before mounting. In one embodiment, the mount 48, 92, 132, the cover 20, and the trim 68, 112 are attached to each other and then mounted on the surface 14, 104 of the vehicle 10, 106 adjacent to and behind the protrusion 16 as a single unit. In another embodiment, the mount 48, 92, 132 is mounted on the surface 14, 104 of the vehicle 10, 106 adjacent and behind the protrusion 16, the cover 20 is attached to the mount, and the trim 68, 112 is attached to the cover and/or mount, in this order. In yet another embodiment, the mount 48, 92. 132 and the cover 20 are attached to each other, the mount and cover are mounted on the surface 14, 104 of the vehicle 10, 106 adjacent and behind the protrusion 16, and the trim 68, 112 is attached to the cover and/or mount, in this order.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A retrofit fairing configured for mounting on a vehicle having a surface and a protrusion extending outward from the surface, the protrusion including an outer surface, the fairing comprising:

a mount having a forward end adapted for mounting on the vehicle surface adjacent to and behind the protrusion; and a cover mounted on the mount, the cover having a forward end, an aft end opposite the forward end of the cover, and opposing sides extending between the forward end of the cover and the aft end of the cover, the opposing sides becoming progressively closer together from the forward end to the aft end so that the bracket has a tapered shape, the forward portion of the cover configured to be mounted flush against the protrusion and partially cover the protrusion;

wherein the mount includes a base adapted for mounting on the vehicle surface adjacent to and behind the protrusion, and a pair of flanges extending from the base, each of said flanges being adapted for attaching to one of said sides of the cover to mount the cover on the mount when mounting the fairing on the vehicle, and wherein a height of one of the pair of flanges is greater than a height of the other of the pair of flanges.

2. A fairing as set forth in claim 1 wherein said mount is mounted on the vehicle surface by adhesive bonding or riveting.

3. A fairing as set forth in claim 1 wherein said cover comprises a substantially transparent material.

4. A fairing as set forth in claim 1 wherein the forward end of the cover overlaps the protrusion in generally two orthogonal directions when the cover is mounted on the mount.

5. A fairing as set forth in claim 1 wherein:
the cover has a maximum height adjacent the forward end of the cover, a maximum width adjacent the forward end of the cover, a minimum height adjacent the aft end of the cover, and a minimum width adjacent the aft end of the cover; and
the maximum height of the cover corresponds to a maximum height of said protrusion.

6. A fairing as set forth in claim 1 further comprising a trim having a forward end, an aft end opposite the forward end of the trim, and opposing sides extending between the forward end of the trim and the aft end of the trim and forming a tapered shape corresponding to the tapered shape of the cover, wherein the sides of the trim are attached to the sides of the cover when mounting the fairing on the vehicle.

7. A fairing configured for mounting on a vehicle having a surface and a protrusion extending outward from the surface, the fairing comprising:
- a cover;
- a mount including a base adapted for mounting on the surface of the vehicle adjacent to and behind the protrusion and a pair of flanges extending from the base, each of said flanges being adapted for attaching to a side of the cover to mount the cover on the mount, a height of a first flange of the pair being greater than a height of a second flange of the pair;
- the cover having a forward end, an aft end, and opposing sides extending between the forward and aft ends, the opposing sides becoming progressively closer together from the forward end to the aft end so that the mount has a tapered shape; and
- a trim having a tapered shape corresponding to the tapered shape of the cover, wherein sides of the trim are attached to the sides of the cover when mounting the fairing on the vehicle, wherein a side of the trim corresponding to the first flange is taller than a side of the trim corresponding to the second flange.

8. A fairing configured for mounting on a vehicle having a surface and a protrusion extending outward from the surface, the vehicle having a step portion adjacent the protrusion, the fairing comprising:
- a mount adapted for mounting on the vehicle adjacent to and behind the protrusion;
- a cover mounted on the mount, the cover having a forward end, an aft end, and opposing sides extending between the forward and aft ends, the opposing sides becoming progressively closer together from the forward end to the aft end so that the cover and the mount have a tapered shape; and
- a trim having a tapered shape corresponding to the tapered shape of the cover, wherein sides of the trim are attached to the sides of the cover when mounting the fairing on the vehicle, wherein said trim has a base portion for positioning directly adjacent said vehicle when mounting the fairing on the vehicle, the base portion of the trim including a step adjacent the forward end of the trim corresponding to the step portion of the vehicle for enabling a flush fit between the fairing and the vehicle when the fairing is mounted on the vehicle.

* * * * *